Patented Dec. 11, 1934

1,984,305

UNITED STATES PATENT OFFICE 1,984,305

MAKING ARSENATE OF LEAD

Oscar Fred Hedenburg, Pittsburgh, Pa., assignor, by mesne assignments, to The Grasselli Chemical Company, Cleveland, Ohio, a corporation of Delaware No Drawing. Application July 12, 1932, Serial No. 622,115

8 Claims. (Cl. 167—15)

This invention relates to the production of arsenate of lead and more particularly to a method which includes the incorporation of a small amount of a volatile oil such as kerosene or other medium boiling petroleum distillate in the reaction product obtained by the interaction of a lead compound with arsenic acid or arsenic oxid before the filtration of the arsenate of lead therefrom. It includes the process and the arsenate of lead product which contains only a trace of the volatile oil.

It has been proposed to make arsenate of lead unwettable by treating it with paraffin or lead oleate or other water-resistant material. The product of the present invention, however, is to be distinguished from such prior products in that it is readily wet by water and is particularly adapted for suspension in a water solution to be used for spray purposes.

I have found that by incorporating a volatile oil of intermediate boiling range such as kerosene in the reaction mass containing the lead arsenate, before filtering it, the cake from the filter press dries with little or no case hardening and the dried cake is more friable and may be redried more easily to a powder with few coarse particles. The powdered arsenate of lead thus produced disperses better in water and remains in suspension better. The volatile oil is substantially all evaporated from the arsenate of lead during the drying process.

According to the preferred method of carrying out this invention, normal or acid arsenate of lead is produced by directly combining finely divided lead oxid, such for example, as yellow sublimed or "fumed" lead oxid, or litharge, with arsenic acid or arsenic oxid. Preferably sublimed or "fumed" litharge is used and I prefer to add the oil, such as kerosene, to the litharge suspension before forming arsenate of lead from it. About two gallons of kerosene per thousand pounds of litharge gives satisfactory results.

As an example of the practical application of the invention, I will describe the production of a batch of substantially 4200 pounds of dried arsenate of lead. About 1000 gallons of water are placed in a tank or other suitable receptacle provided with agitating means and heated to a temperature of about 90° C. by steam or other suitable heating means. When this temperature is reached about 2700 pounds of finely divided litharge is fed into the tank by dumping in the litharge from its original barrels or containers. Agitation of the lead oxid in the hot water is continued for about fifteen minutes or until a thorough suspension is secured and a partial solution or hydrolysis of the lead oxid is accomplished, thereby giving the solution an alkaline reaction. Cold water is now run into the tank to reduce the temperature to about 70° C. and to increase the volume to about 2000 gallons.

To this suspension there is added with agitation about five gallons of kerosene. I prefer to employ kerosene which evaporates substantially completely from paper or cloth in a few hours. The arsenic acid is made to have about 50% of arsenic oxid and to be as free as possible of nitric acid and arsenious oxid, for example, about or less than 0.02% of each. The arsenic acid may be added to the litharge suspension in its concentrated condition or it may be diluted with water before addition. Theoretically, an amount of arsenic acid equivalent to about 1392 pounds of arsenic oxid is required to convert 2700 pounds of lead oxid into acid lead arsenate. The acid lead arsenate contains theoretically 33.13% of arsenic oxid. It is desired to obtain this theoretical condition or substantially so. The arsenate of lead prepared by this method has an arsenic oxid content of 33% to 33.1%. If the arsenic acid contains 50% of arsenic oxid, then 2784 pounds will be used, and more or less as the arsenic acid contains less or more of arsenic oxid than 50%.

The arsenic acid to be used is divided into six equal portions. Each portion is weighed in a tub on a truck which is placed so the spigot in the barrel will deliver the arsenic acid into the tank containing the litharge suspension. The arsenic acid is allowed to flow from the tubs into the litharge suspension so that the first and second tubs are emptied during forty-five minutes each in succession, i. e., the first third of the acid is added during one hour and thirty minutes. The remaining four tubs of equal portions are added in fifteen minutes each in succession, requiring about one hour to add the remaining two-thirds of the arsenic acid. It is seen that the first third of the arsenic acid is added gradually whereas the rest of the acid is added quite rapidly. During the addition of about one-half of the arsenic acid the water of the litharge suspension shows an alkaline reaction to phenolphthalein.

When the arsenic acid has been added and agitation continued for a few minutes, a sample is drawn from the suspension in the tank, filtered, washed, dried and analyzed for arsenic oxid. If the arsenic oxid content is not 33.1%, the amount of arsenic oxid necessary to make the arsenic of lead contain 33.1% is added as a calculated amount of arsenic acid. After this final acid is added, agitation is continued to allow reaction to occur so that the arsenic oxid is combined with the lead oxid to form acid lead arsenate.

When all the arsenic acid has been added some cold water is run in to cool the mass before filtration. The arsenate of lead is filtered without washing either by settling or in the filter press. Sufficient kerosene separates from the reaction mixture with the lead arsenate to prevent or at least reduce case hardening of the filter cakes while they are being dried and the dried product can be readily reduced to a powder which contains no more than a very small amount of coarse particles. Substantially all of the kerosene is vaporized during the drying of the filter cakes, although the dried product will generally retain sufficient kerosene to impart an odor to it. The product is readily wettable by water and easily suspended in a water solution. If desired, a small amount of a deflocculating agent for example, 1 to 1¼% of powdered gum arabic may be mixed with the dried arsenate of lead to facilitate the preparation of spray suspensions.

The arsenate of lead produced in accordance with this method remains in suspension in a liquid such as water for extended periods and is particularly adapted for employment as an insecticide. When so employed and applied to vegetation the arsenate is deposited in the form of fine particles which spread themselves quite uniformly over the surface to which the material is applied.

I claim:

1. In a process of producing a lead arsenate, readily wettable by water, the steps of incorporating a small amount of a medium boiling petroleum distillate in an aqueous suspension of lead arsenate before filtration of the lead arsenate therefrom, separating the lead arsenate from the liquid medium and drying it.

2. In a process of producing a lead arsenate, readily wettable by water, the steps of incorporating a small amount of kerosene in an aqueous suspension of lead arsenate before filtration of the lead arsenate therefrom separating the lead arsenate from the liquid medium and drying it.

3. The method of preparing arsenate of lead which comprises reacting lead oxid with arsenic acid or oxid and incorporating a small amount of a medium boiling petroleum distillate in the reaction mixture and then filtering the resulting mass to produce filter cakes of lead arsenate which contain a small amount of the medium boiling petroleum distillate dispersed therein.

4. The method of producing lead arsenate which comprises suspending in water finely divided litharge and about two gallons of kerosene per one thousand pounds in lead oxid, reacting the litharge with arsenic acid or oxid and filtering the reaction mixture.

5. The method of producing lead arsenate which comprises suspending in water finely divided litharge and about two gallons of kerosene per one thousand pounds of litharge, reacting the litharge with arsenic acid or oxid, filtering the reaction mixture to produce a filter cake in which a small amount of kerosene is dispersed and then drying the filter cake and evaporating substantially all of the kerosene therefrom.

6. Finely divided lead arsenate which is readily wettable by water and contains a trace of a medium boiling petroleum distillate uniformly distributed throughout said lead arsenate.

7. Finely divided lead arsenate which is readily wettable by water and contains a trace of kerosene uniformly distributed throughout said lead arsenate.

8. Finely divided lead arsenate which is readily wettable by water and contains a small amount of gum arabic and a trace of kerosene uniformly distributed throughout said lead arsenate.

OSCAR FRED HEDENBURG.